(12) United States Patent
Cazes et al.

(10) Patent No.: US 12,257,760 B2
(45) Date of Patent: Mar. 25, 2025

(54) METHOD FOR MANUFACTURING A COATED PLASTIC PART

(71) Applicant: NOVARES FRANCE, Vélizy-Villacoublay (FR)

(72) Inventors: Christophe Cazes, Versailles (FR); François Lelievre, Anthony (FR); Miguel Frade, Leiria (PT)

(73) Assignee: NOVARES FRANCE, Vélizy-Villacoublay (FR)

( * ) Notice: Subject to any disclaimer, the term of this patent is extended or adjusted under 35 U.S.C. 154(b) by 0 days.

(21) Appl. No.: 18/289,020

(22) PCT Filed: May 4, 2022

(86) PCT No.: PCT/FR2022/050858
§ 371 (c)(1),
(2) Date: Oct. 31, 2023

(87) PCT Pub. No.: WO2022/234231
PCT Pub. Date: Nov. 10, 2022

(65) Prior Publication Data
US 2024/0208132 A1    Jun. 27, 2024

(30) Foreign Application Priority Data
May 6, 2021    (FR) ...................................... 2104806

(51) Int. Cl.
*B29C 51/14*        (2006.01)
*B29C 45/14*        (2006.01)
(Continued)

(52) U.S. Cl.
CPC .......... *B29C 51/14* (2013.01); *B29C 45/1418* (2013.01); *B29C 45/14311* (2013.01);
(Continued)

(58) Field of Classification Search
CPC ........... B29C 2045/14155; B29C 2045/14245; B29C 2791/001; B29C 2791/006;
(Continued)

(56) References Cited

U.S. PATENT DOCUMENTS

| 2007/0281133 A1* | 12/2007 | Smith | B60R 13/02 264/293 |
| 2020/0031886 A1 | 1/2020 | Morinaga et al. | |
| 2020/0061886 A1* | 2/2020 | Forgette | B29C 51/02 |

FOREIGN PATENT DOCUMENTS

DE    102015216526 A1    3/2017

OTHER PUBLICATIONS

International Search Report for corresponding application PCT/FR2022/050858 filed May 4, 2022; Mail date Aug. 18, 2022.

* cited by examiner

*Primary Examiner* — Sonya M Sengupta
(74) *Attorney, Agent, or Firm* — CANTOR COLBURN LLP

(57) ABSTRACT

The invention relates to a method for manufacturing a coated plastic part (1) intended to be integrated into a passenger compartment of a motor vehicle, the coated plastic part including a base part comprising a raised section (6), and a sheet (3) comprising a useful surface (11), the method comprising a step of creating (102, 201) at least one flap (12) in the useful surface, a positioning step (103, 202) in which the sheet is positioned opposite a shaping tool (15) comprising a raised area (14) of a complementary shape to the raised section (6), a shaping step (104, 203), in which the sheet is pressed against the shaping tool (15), and a joining step (105, 204) in which the sheet and the base part are held against each other so as to facilitate the rigid connection of the sheet and the base part.

7 Claims, 6 Drawing Sheets

(51) Int. Cl.
  *B29C 45/16* (2006.01)
  *B29C 51/26* (2006.01)
  *B29C 51/36* (2006.01)
  *B29K 21/00* (2006.01)
  *B29L 31/30* (2006.01)
  *B29L 31/34* (2006.01)

(52) U.S. Cl.
  CPC ........ *B29C 45/1657* (2013.01); *B29C 51/264* (2013.01); *B29C 51/36* (2013.01); *B29C 2045/14245* (2013.01); *B29K 2021/003* (2013.01); *B29L 2031/30* (2013.01); *B29L 2031/34* (2013.01)

(58) Field of Classification Search
  CPC .......... B29C 2795/005; B29C 45/1418; B29C 45/14221; B29C 45/14311; B29C 45/1657; B29C 51/14; B29C 51/264; B29C 51/266; B29C 51/36; B29L 2031/30; B29L 2031/3005; B29L 2031/34; B29L 2031/3406; B29K 2021/003
  See application file for complete search history.

METHOD FOR MANUFACTURING A COATED PLASTIC PART

TECHNICAL FIELD

The present disclosure concerns a thermoplastic passenger compartment part for a motor vehicle, in particular a coated plastic part which is decorated and/or having a control device and a method for manufacturing the coated plastic part.

BACKGROUND

The passenger compartment of a motor vehicle constitutes for users—driver and possible passengers—a place to live and interact, and comprises coated plastic parts.

By coated plastic parts, reference is made to any part made of a thermoplastic material and coated of a sheet. The sheet can be an active sheet, that is to say a sheet provided with electrical or electronic components, for example sensors, or an inert sheet, that is to say a sheet without electrical or electronic component.

The coated plastic parts comprising an active sheet are generally used within the control device, allowing monitoring functions of the vehicle.

These functions are very diverse in nature and can concern in particular the opening and the closing of the vehicle doors, the orientation of the side mirrors, as well as the opening and the closing of the windows fitted to the side doors of the vehicle. The controls typically found inside a vehicle and which constitute the interface for monitoring the functions of a vehicle are in particular of the type:
  push buttons to, for example, control the locking of a vehicle
  rotary buttons to, for example, control the temperature setting of the air conditioning system;
  rocker buttons to, for example, control the mechanism for opening/closing the windows
  trigger to, for example, control the mechanism for opening the doors
  sliders to, for example, control the temperature setting of the air conditioning system The control devices comprising such coated plastic parts are located in several places within the passenger compartment, for example on the door trims, within the armrest, near the gear lever, or even on the steering wheel. The passenger compartment is thus equipped with a multitude of control members.

More specifically, in a control device with electrical controls, each of the control zones is assigned to a specific function of the motor vehicle. The control device thus produced comprises a coated plastic part integrating an active sheet, sensitive to the proximity and/or touch via a detection surface coated with sensors. The sheet is disposed on the surface of a plastic part, called base part, in such a manner that each of the sensors is contiguous, that is to say facing one of the control zones.

Each sensor is configured for example to detect the proximity and/or touch of a finger of the user, by sending a signal to an electronic control unit arranged on a printed circuit board.

The contiguity between the sensors and the control zones is essential to enable the accomplishment of a good detection of the user's finger, and thus guarantee a good responsiveness of the selected function.

The control zones are arranged on a flat sector or a raised sector. By raised sector, reference is made to any zone with an awkward shape, for example an embossment or a recess.

The coated plastic parts comprising an inert sheet are often used on the dashboard, the door armrests, the steering wheel or on the center console. Such parts are provided with visual indications, most of the time painted or printed on the inert sheet. Such visual indications are often for a decorative or informative purpose. It is important that the visual rendering after manufacture of the coated plastic part is as accurate as possible, that is to say corresponds to that desired in the design phase, in particular during the application on raised sectors of the base part.

Also, in general, it is sought that the useful surfaces of the sheet, that is to say the surfaces intended to receive a component in the case of an active sheet, or to receive a visual indication in the case of an inert sheet, can conform to the raised sectors.

Typically, to manufacture a coated plastic part, the sheet is thermoformed on a surface of the base part, in order to allow conforming to the shapes of the base part. Such a method for assembling the sheet to the base part consists of heating the sheet to a predetermined temperature, before applying it by pressure on a surface of the base part.

An example of manufacturing by thermoforming a control device integrating a coated plastic part is described in WO 201358708 (FISCHER TECHNOLOGY).

The thermoforming method allows securing the sheet to the shape of the base part. However, it has been observed that following the application of the sheet on the base part, a lack of contiguity, in other words a gap between the control zones having raised sectors, and the surfaces may occur. Such an anomaly comes from an excessive stretching of the sheet during its application on the inner surface. The stretching causes a deformation that remains when the sheet is hardened after cooling.

Another anomaly can be observed with the deformation of pictograms, logos or decorative patterns of a passive sheet during this thermoforming step.

In the case of an active sheet, such a lack of contiguity has the consequence that the components in the useful zone, for example sensors undergo a deformation themselves, or are then displaced and do not face the control zones. If the components are sensors, the lack of contiguity has the consequence that the detection of the contact is deficient, because the measured physical value no longer corresponds to the physical value as initially envisaged. It is therefore necessary before any activation of the control device comprising the coated plastic part to perform the recalibration of the sensor. Yet, such recalibration has an impact on the manufacturing time as well as the overall production cost of the control device.

Furthermore, such a thermoforming operation can damage the electronic components themselves because the hot deformation of the active sheet having these components can be significant in some places, in particular when the plastic part comprises raised sectors with complex shapes or with low radii of curvature. Similarly, the heat required for this thermoforming operation can damage the components, in particular the sensors. Also, a significant amount of scrap of coated plastic parts manufactured according to such a method has been found.

Also, such a method for manufacturing the coated plastic part is energetically costly, in particular due to the use of a heat source to enable the completion of the thermoforming and requires also an additional manufacturing cycle time.

Such drawbacks are also found in the manufacture of a coated plastic part comprising an inert sheet.

BRIEF SUMMARY

The disclosure aims in particular to resolve the aforementioned drawbacks.

A method is proposed for manufacturing a coated plastic part, which allows in the case of a sheet provided with sensors, performing a good detection in a control device integrating such a coated plastic part.

Such method is proposed which allows making a coated plastic part having raised sectors with complex shape.

A further method is proposed which offers a limited energy consumption, and a reduced manufacturing cycle time.

Further, a coated plastic part is obtained by such a method.

Also, a motor vehicle is provided comprising such a coated plastic part.

To this end, it is proposed firstly a method for manufacturing a coated plastic part intended to be integrated into a passenger compartment of a motor vehicle, the coated plastic part including a base part made of thermoplastic material comprising at least one raised sector, a sheet comprising at least one useful surface, the method comprising a step of creating at least one flap in the useful surface, a positioning step in which the sheet is positioned facing a shaping tool comprising a relief area of shape complementary to the raised sector of the base part, the useful surface being positioned opposite the raised area, a shaping step in which the sheet is pressed against the shaping tool, the flap being displaced to contact the raised area, a joining step in which the sheet and the base part are held against each other so as to allow securing the sheet to the base part.

The production of flaps which are applied on the raised sectors allows avoiding the creation of a gap between the sheet and the surface of the base part during the application of the sheet, and eliminating the thermoforming during the securing of the sheet to the base part. In addition, the method is reliable and easily achievable on known machines.

Advantageously, during the shaping step, the sheet is pressed against the shaping tool via a suction force created by a depression originating from the shaping tool.

Advantageously, the method comprises a creation step comprising making cuts and markings of at least one fold within the useful surface, according to a predetermined pattern, so as to define a flap.

Advantageously, the cuts are made using a punching tool, a cutting blade, a plasma cutting tool, or a laser cutting tool.

Advantageously, the marking of at least one fold is made using a laser or die-forging tool.

Advantageously, the base part is obtained before the joining step, the method comprising before the positioning step, a step of gluing including the application of an adhesive on the useful surface, securing the sheet to the base part during the joining 5 step is performed by hardening the applied adhesive.

Advantageously, the adhesive is a glue deposited on the useful surface by spraying, or by lamination or by application of a stencil previously glued by the glue.

Advantageously, the joining step is carried out within a die-forging machine, the die-forging machine comprising a die capable of translating, the die being provided with the shaping tool, the die-forging machine also comprising a platform receiving the base part, during the joining step the die translating and putting into contact the base part and the sheet.

Advantageously, the method comprises an injection step, the injection step and the joining step being carried out in an injection molding machine comprising a first mold half having a molding wall provided with the shaping tool provided with a suction force allowing applying the sheet against the shaping tool, the mold halves being displaced relative to each other and being capable of being sealingly joined together by defining a molding cavity having a shape identical to the base part, during the injection step, the mold halves are joined together, a thermoplastic liquid is introduced 20 into the cavity, the joining step being carried out by cooling the thermoplastic injected into the molding cavity.

Secondly, it is proposed a coated plastic part intended to be integrated within a passenger compartment, the plastic part comprising a base part, and a sheet, the base part and the sheet being secured to each other, the plastic part being obtained according to the method presented above.

Advantageously, the sheet of the coated plastic part is an active sheet comprising at least one useful surface provided with a sensor.

Thirdly, it is proposed a motor vehicle provided with said coated plastic part.

BRIEF DESCRIPTION OF THE DRAWINGS

Others features and advantages of the disclosure will appear more clearly and concretely upon reading the following description of embodiments, which is made with reference to the appended drawings in which.

DETAILED DESCRIPTION

Figure 1:
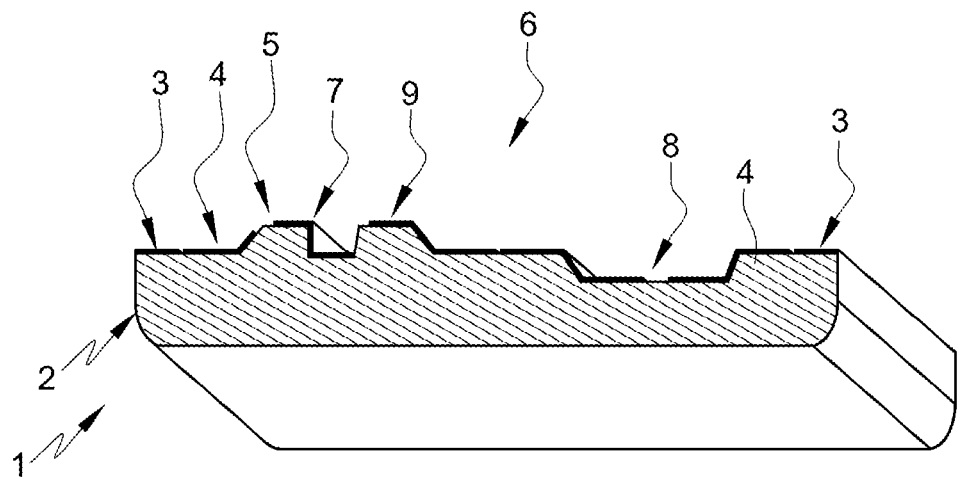
FIG. 1 represents a schematic top view of a sheet having cuts.

FIG. 1 represents a coated plastic part 1, that is to say a base part 2 provided with a sheet 3. The sheet 3 covers a joining surface 4 of the base part 2.

The coated plastic part 1 is intended to be integrated into a passenger compartment of a vehicle, for example a motor vehicle (not shown).

The coated plastic part 1 illustrated in FIG. 1 is intended to be implemented for example, within a door of a motor vehicle (not shown). The coated plastic part 1 thus shown is for example intended to be integrated into a door control device performing functions such as the opening and the closing of the side windows, the locking and the unlocking of the doors, as well as the orientation of the side mirrors.

In other not shown embodiments, the coated plastic part 1 is intended to be integrated into the dashboard of a vehicle, or within a center console module. The coated plastic part 1 is for example intended to be integrated within a dashboard control device comprising for example controls for the functions of starting the vehicle, or ventilation of the passenger compartment.

Typically, a control device allows making an interface between the user and a monitoring unit, for example a vehicle on-board computer (not shown).

In other embodiments, the coated plastic part 1 is integrated into other interior parts of the vehicle, for example a gear lever, a steering wheel, a control box near a steering wheel such as a combination control, or an armrest of a seat.

The coated plastic part 1 comprises a sheet 3 disposed on a base part 2.

In the shown embodiments, the base part 2 offers a general structure of a solid part, but in other not shown embodiments, the base part 2 is in the form of a shell. Such an arrangement allows the base part 2 to be easily inserted into the trim of a door, a dashboard or any other element of the passenger compartment provided for receiving the coated plastic part 1.

The base part 2 is preferably made of a thermoplastic material, and is advantageously obtained by a molding method, for example by injection molding, as described below.

The joining surface 4 of the base part 2 is intended to be covered with the sheet 3.

As can be noted in particular for example in FIG. 1, the base part 2 comprises flat sectors 5 and raised sectors 6. The raised sectors 6 comprise embossments 7 projecting from the joining surface 4, or recesses 8 in the joining surface 4.

In order to allow the coated plastic part 1 to be manufactured according to the methods described below in the description, the embossments 7 and recesses 8 are provided with a small depth, this limited depth can be determined by experience.

Figure 2:
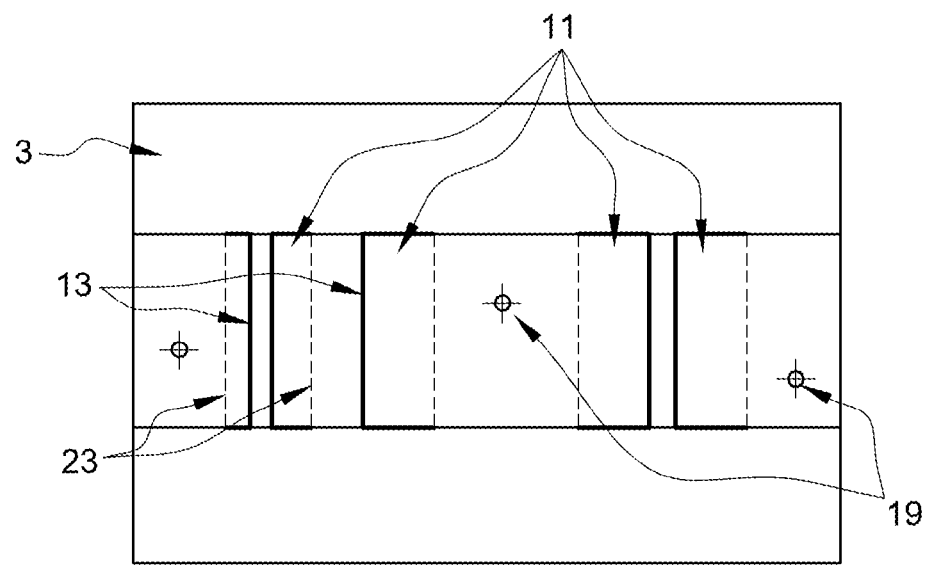
FIG. 2 represents a schematic top view of a sheet having glued useful surfaces.
Figure 3:
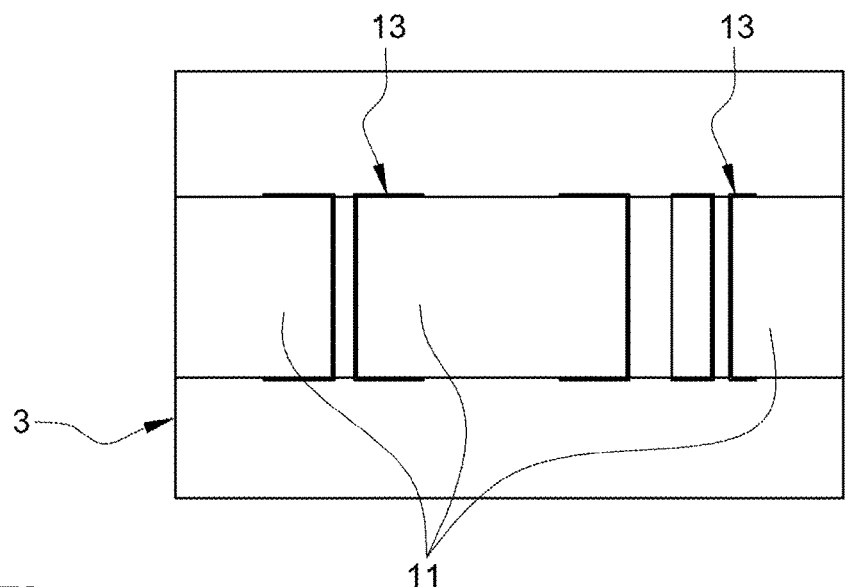
FIG. 3 represents a schematic top view of a sheet after shaping.
Figure 4:
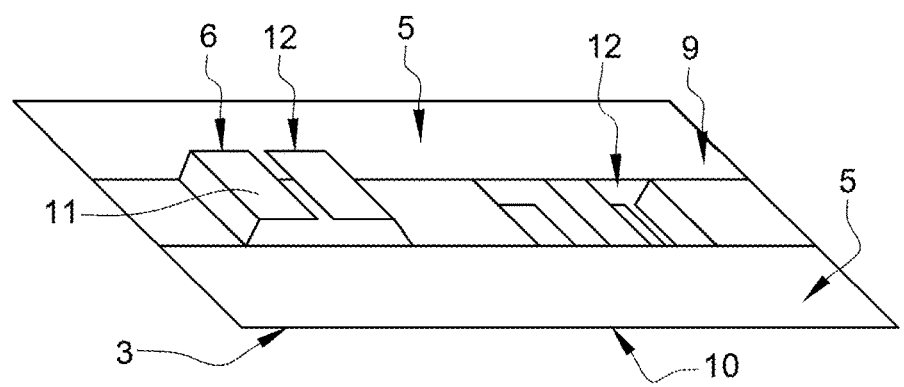
FIG. 4 represents a schematic perspective view of a base part.
Figure 5:
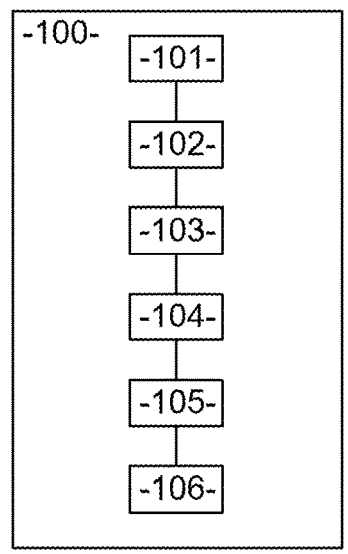
FIG. 5 represents a flowchart illustrating the different steps of a method for manufacturing a coated plastic part according to the first manufacturing mode.

The sheet 3 is described now more particularly, with reference to FIGS. 2, 3 and 4.

The sheet 3 is advantageously made of a thermoplastic material, for example a polymer substrate, such as that used for the flexible printed circuits, or polyethylene terephthalate (PET) coated with indium-tin oxide (ITO).

In order to facilitate its assembly on the joining surface 4 of the base part 2, the sheet 3 is made with such flexibility that it can for example be rolled up manually.

In one embodiment, the sheet 3 is active that is to say provided with electrical or electronic devices (not shown). For example, the sheet 3 comprises an active face advantageously coated with a substrate (not visible in the figures) allowing printing of tracks (not shown) and sensors (not shown). The tracks are for example connected to sensors as well as to the printed circuit board.

In another embodiment, the sheet 3 is passive that is to say devoid of electrical or electronic devices, but preferably comprises only a visual coating such as paint, for example to represent a pattern, a logo, a pictogram or any other decorative means.

Whether the sheet 3 is active or passive, it advantageously comprises a free, visible face 9 and a contact face 10, intended to be secured to the base part 2.

Advantageously, the contact face 10 comprises a useful surface 11. In the case of an active sheet 3, the useful surface 11 is intended to accommodate an electrical or electronic device linked to a control, and is intended to receive the user's finger.

In not shown embodiments, the sheet 3, whether it is active or inert receives visual indications in the form for example of painted or printed pigments.

A useful surface 11 is integrated for example into a flap 12, advantageously obtained by cutting, as described below in the description.

As can be seen in FIG. 3, the sheet 3 comprises a plurality of useful surfaces 11. Such useful surfaces 11 are positioned sufficiently far apart from one another so that flaps 12 can be formed, and be moved according to the manufacturing methods 100, 200 described below.

A first example of a method for manufacturing 100 the control device 1 is described now by referring to FIGS. 5 to 9.

In a gluing step 101, the useful surface 11 of the sheet 3 is coated with a glue or an adhesive, so as to allow the sheet 3 to be assembled on the joining surface 4 of the base part 2. The use of glue allows carrying out an assembly, a securing, a joining of the sheet 3 on the coated plastic part 1 by avoiding any thermoforming. In this way, the risk of undesirable deformation of the sheet 3 is limited, and the energy consumption is under control.

Advantageously, during the gluing step 101, the glue is deposited by spraying, or lamination or by application of a previously glued stencil.

In a creation step 102, it advantageous to make cuts 13 within the useful surface 11, according to a predetermined pattern, so as to form the flap 12. The pattern of the cuts 13 is determined according to the raised sector 6 to be coated. The cuts 13 are advantageously in the form of a broken line, for example with three sides.

During the creation step 102, a fold is made. Such a fold 23 advantageously connects the flap 12 to the useful surface 11. In this way, the fold 23 serves as a hinge which allows the flap 12 to be displaced according to the raised sector 6 to be coated. In this way, the flap 12 comprising several cuts and at least one fold 23 is capable of conforming to a shape complementary to the base part 2 such as the corresponding raised sector 6.

Advantageously, the fold 23 is marked using a die-forging tool or a laser tool.

The flaps 12 also serve to ensure that the useful surface 11 is opposite to the corresponding raised sector 6. This allows ensuring that the sheet 3 is accurately deposited on the joining surface 4.

In the case of an active sheet 3, an accurate deposition of the sheet 3 on the joining surface 4 prevents the application of a force of the user from being erroneously detected.

Also, the application of a user's finger on a sensor arranged within the sheet 3 activates only the detection of said sensor associated with the associated control zone, and not another sensor. The occurrence of an undesirable deformation of any sensor not linked to the function selected by the user of a control device integrating the coated plastic part 1 is therefore considerably limited.

In the case of an inert sheet 3, the production of such flaps 12 has the advantage of allowing obtaining a coating having a rendering as close as possible to that desired, without the risk of folds, or misalignment.

Advantageously, the cuts 13 are made with a punching tool, which enables a fast and economic formation of the flaps 12.

In other embodiments, the cuts 13 are made by other means: a blade, by laser or plasma cutting. The choice of such means allows adapting the accuracy and the speed of production of the flaps depending on the type of the desired application for the coated plastic part 1.

In a step positioning 103, the sheet 3 is placed opposite a shaping tool 15 comprising a forming surface 16. The forming surface 16 comprises a raised area 14, complementary in shape to the joining surface 4, that is to say the raised area 14 has the "negative" of the raised sector 6.

The shaping tool 15 materializes for example in the shape of a plate having the forming surface 16. In this way, such a plate can be for example integrated on a die, a mold, a shell, a vice, which allows the manufacturing method to be carried out on several different types of machines.

In a shaping step 104, the sheet 3, more specifically the free face 9 is pressed against the shaping tool 15, and once pressed, is kept applied against the shaping tool 15. In other words, in such a step, the sheet 3 is gripped by the shaping tool 15. Such an operation is performed for example by means of a suction force which generates a depression air flow, or else by a dedicated mechanical device (not shown).

In advantageous embodiments, it is possible to combine the suction force with the use of a dedicated mechanical device, which allows increasing the pressing force.

Advantageously, the shaping tool 15 comprises a plurality of nozzles 17 connected to a vacuum generating device. The nozzles 17 are advantageously disposed in a regular manner, in particular in a direction substantially normal to the forming surface 16. The suction force is thus distributed all along the forming surface 16, which avoids any gap between the forming surface 16 and the sheet 3, or the formation of undesirable folds. Consequently, in the case of an active sheet provided with sensors, it is possible to increase the quality of detection compared with known methods, or for a passive sheet to obtain an aesthetic rendering as close as possible to that expected.

In order to guarantee an accurate alignment, and to ensure that each raised sector 6 faces each of the raised areas 14, the shaping tool 15 comprises centering pins 18, capable of being inserted into the positioning holes 19 provided in the sheet.

In a joining step 105, the sheet 3 is brought closer to the base part 2 until the sheet 3 is secured to the joining surface 4. For example the sheet 3 is kept applied for the time that the bonding between the joining surface and the forming surface 16 takes place.

The manufacturing method 100 according to the first manufacturing mode is advantageously carried out on a die-forging machine 20 as shown in FIGS. 6 to 9.

Such a die-forging machine 20 comprises for example a die 21, which translates in a vertical direction, and a platform 22 fixed relative to the die 21. The platform 22 receives a base part 2, the die 21 comprises a shaping tool 15.

Figure 6:
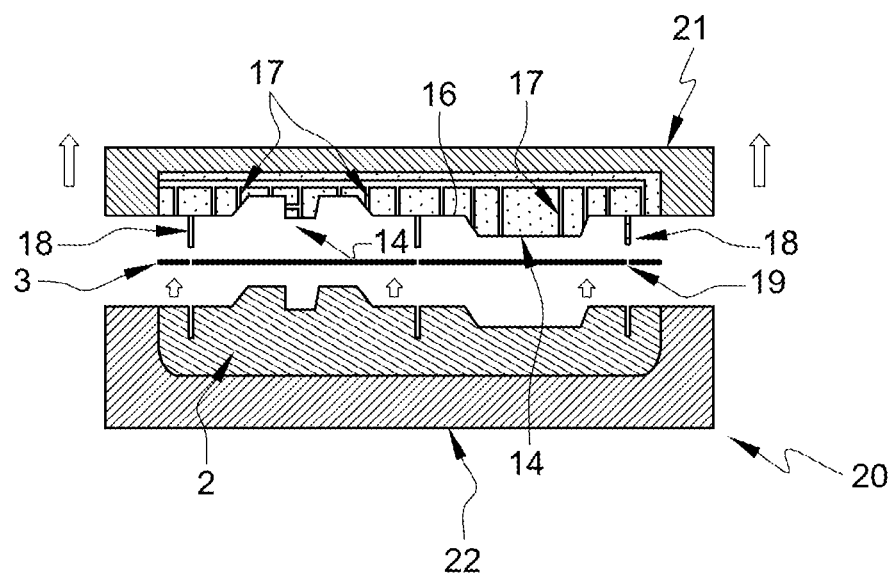
FIG. 6 represents a schematic sectional view of a die-forging machine for manufacturing according to the first manufacturing mode the coated plastic part, the die-forging machine being represented in a positioning step.

During the creation step 102, the sheet 3 is for example introduced into a cutting machine (not shown), so as to allow making the cuts 13. Advantageously, the sheet 3 provided with cuts 13 is positioned facing the shaping tool 15 arranged within the die 21, as shown in FIG. 6.

Figure 7:
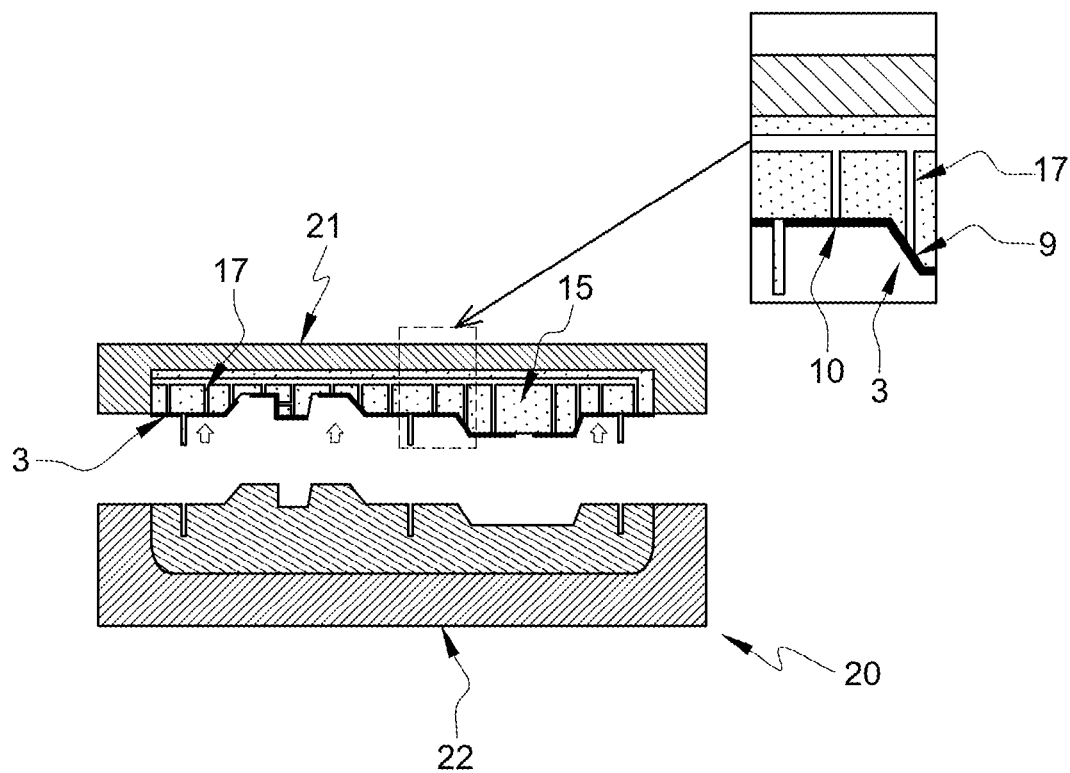
FIG. 7 represents a schematic sectional view of a die-forging machine for manufacturing according to the first manufacturing mode the coated plastic part, the die-forging machine being represented in a shaping step.

During the shaping step 104, illustrated in FIG. 7, the die 21 remains stationary, the sheet 3 being for example displaced by suction created by depression, so that the free face 9 is sucked up and brought into contact with the shaping tool 15.

More specifically, during the shaping step 104, the flaps 12 are displaced and opened thanks to the cuts 13, by forming a fold 23. Thus, the flaps 12 can contact the raised areas 14. As explained earlier in the description, such an arrangement allows obtaining a good contiguity between the raised sector 6 and the raised area 14. In this way, the quality of production of the coated plastic part 1 will be enhanced.

Figure 8:
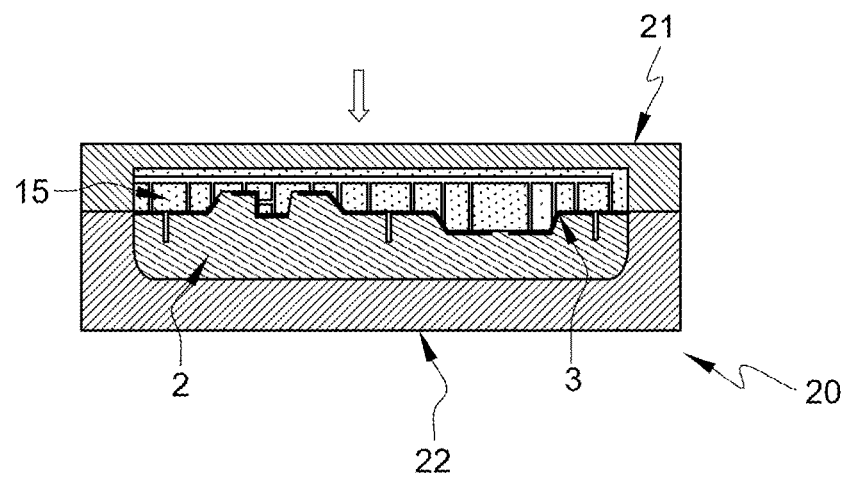
FIG. 8 represents a schematic sectional view of a die-forging machine for manufacturing according to the first manufacturing mode the coated plastic part, the die-forging machine being represented in a removal step.

The joining step 105 shown in FIG. 8 is advantageously carried out by translating the die 21 downwards, which allows placing the contact face 10 against the joining surface 4. In this way, the glue deposited on the contact face 10 engages the joining surface 4, for example by hardening, allowing securing the sheet 3 to the base part 2.

Figure 9:
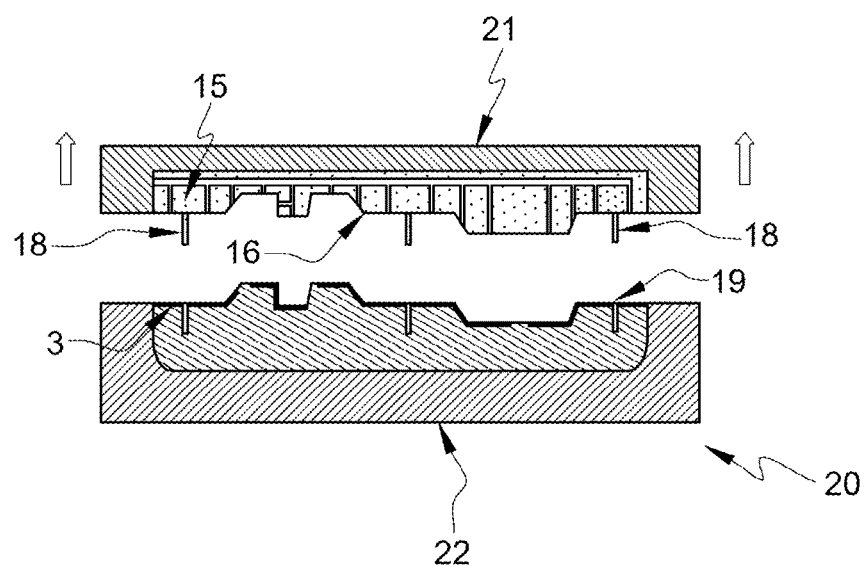
FIG. 9 represents a schematic sectional view of a die-forging machine for manufacturing according to the first manufacturing mode the coated plastic part, the die-forging machine being represented in a securing step.
Figure 10:
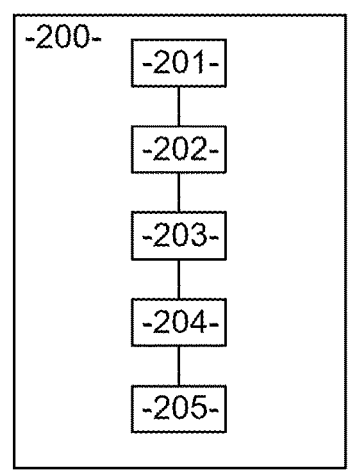
FIG. 10 represents a flow chart of a method for manufacturing according to the second manufacturing mode the coated plastic part.

Advantageously, after securing the sheet 3 to the base part 2, during a removal step 106, the die 21 is moved away from the platform 22, by being for example translated upwards, as it can be seen in FIG. 9, which allows extracting the coated plastic part 1 from the die-forging machine 20.

Such a method 100 according to a first manufacturing mode does not require any heating, which allows limiting the energy consumption. In addition, such a method can be carried out on known machines. Finally, the method 100 allows obtaining a coated plastic part 1 comprising a sheet 3 whose raised sectors 6 are well opposite to the useful surfaces 11, which allows decreasing the non-conformity rate compared with known methods of the prior art.

A second manufacturing mode of the coated plastic part 1 is described now by referring to FIGS. 10 to 14.

The method 200 comprises a step 201 of creating the flaps 12, and a positioning step 202, these two steps being respectively identical to the creation step 101 and the positioning step 103 of the first manufacturing mode.

Unlike the first manufacturing mode, according to the second manufacturing mode the base part 2 is manufactured after a shaping step 203, while according to the first manufacturing mode, the base part 2 is manufactured prior to the manufacturing method 100.

More specifically, the method 200 comprises an injection step 204 in which the base part 2 is made as explained below.

It can be seen in FIGS. 11 to 14, that the method 200 is advantageously performed in an injection molding machine 24 comprising a mold 25 formed of a first mold half 26, and a second mold half 27. The first mold half 26 comprises the shaping tool 15, arranged in such a way that it forms a molding wall 28, such a molding wall 28 directly contacts the material introduced into the mold 25, so as to leave its impression. In this manner, it is possible to form a raised sector 6 and a flat sector 7 on the joining surface 4.

Figure 13:
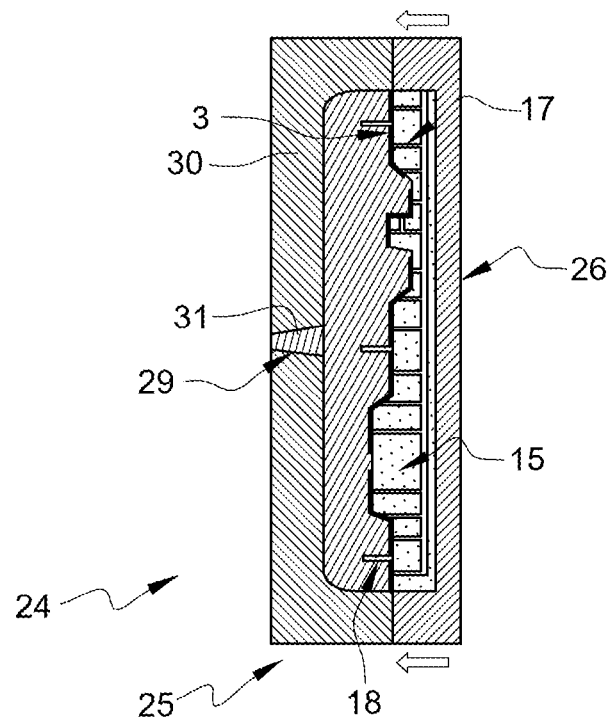
FIG. 13 represents a schematic sectional view of an injection molding machine for manufacturing a coated plastic part obtained according to the second manufacturing mode, the injection molding machine being represented in a securing step.

As can be seen in FIG. 13, the second mold half 27 is for example connected to a thermoformable material injection molding machine (not shown), via an orifice 29, passing through a rear wall 30 of the mold via a channel 31.

In other not shown embodiments, the material injection molding machine is connected differently to the second mold half 27.

The first mold half 26 and the second mold half 27 can be displaced between an open position and a closed position.

Figure 11:
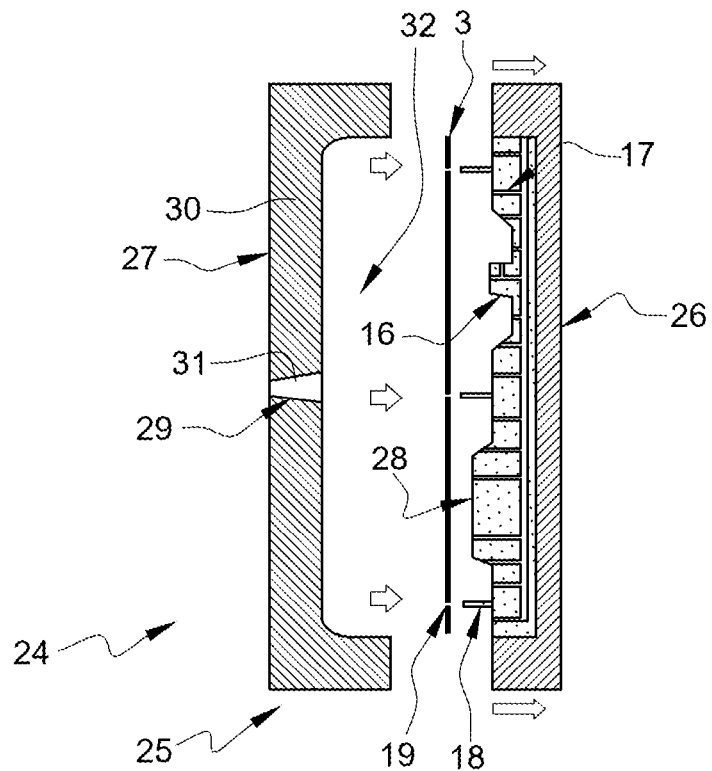
FIG. 11 represents a schematic sectional view of an injection molding machine for manufacturing a coated plastic part obtained according to the second manufacturing mode, the injection molding machine being represented in a positioning step.
Figure 14:
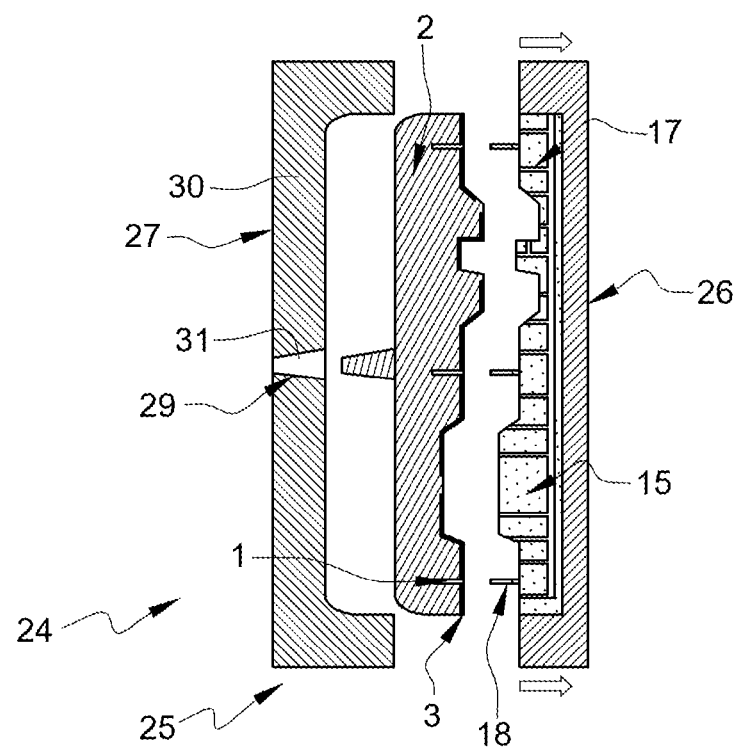
FIG. 14 represents a schematic sectional view of an injection molding machine for manufacturing a coated plastic part obtained according to the second manufacturing mode, the injection molding machine being represented in a release step.

In the open position, visible in FIGS. 11 and 14, the mold halves 26, 27 are disjointed, separated from each other, allowing access to the interior of the mold halves 26, 27.

Figure 12:
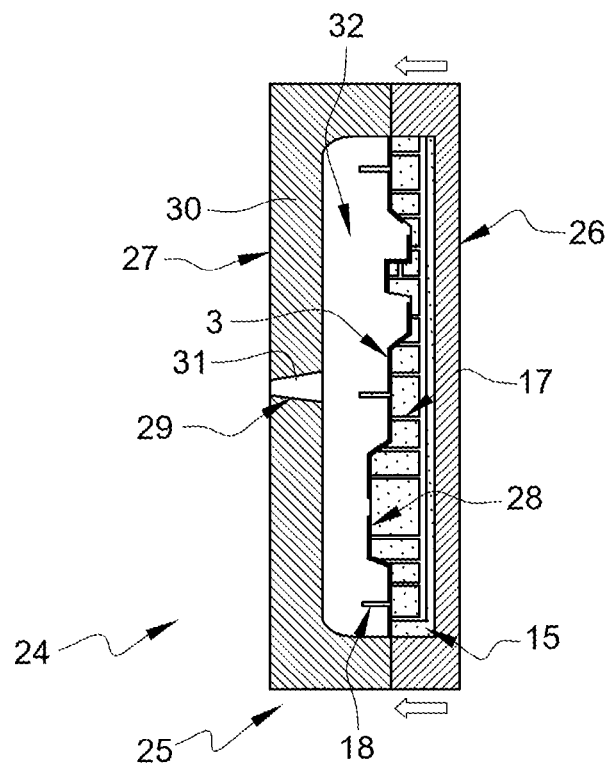
FIG. 12 represents a schematic sectional view of an injection molding machine for manufacturing a coated plastic part obtained according to the second manufacturing mode, the injection molding machine being represented in a shaping step.

In the closed position, visible in FIGS. 12 and 13, the mold halves 26, 27 are joined, that is to say in contact with each other, in order to define a sealed molding cavity 32, which has a volume, an impression, a shape identical to the base part 2. In this way, it is possible to allow molding of a base part 2 having a joining surface 4 provided with raised sectors 6.

In the method 200, during the positioning step 203, or during the shaping step 204, or after such steps, the mold halves 26, 27 are brought closer together, resulting in the formation of the sealed cavity 32.

Once the cavity 32 is formed, molten thermoplastic material is injected under pressure via the orifice 29, in order to obtain the filling of the mold halves 26, 27, and allow the molten thermoplastic material to contact the forming surface 16.

In order to avoid any melting or any undesirable deformation of the sheet 3 due to the contact with the molten thermoplastic, such a thermoplastic is selected to have a melting temperature lower than the melting temperature of the material constituting the sheet 3.

The thermoplastic material is melted for example by heating thermoplastic granules (not shown), such a heating taking place outside the injection molding machine 24.

During the injection step 204, the molten thermoplastic material contacts the sheet 3, held against the shaping tool 15. Advantageously, during this injection step, the free face 9 is kept in contact with the forming surface 16.

During the joining step 205, the formed base part 2 solidifies, for example by stopping the heating of the mold halves 26, 27. During solidification, the thermoplastic material is hardened, allowing securing the sheet 3 to the base part 2, with the result that the contact face 10 is overmolded on the joining surface 4 of the base part 2.

During a release step 206, the mold halves 26, 27 are set to an open position, which allows ejecting the coated plastic part 1.

The manufacturing method according to such a second manufacturing mode allows eliminating a gluing step. In addition, it allows, within the same machine, forming the base part 2, and putting in place the sheet 3 on the base part 2. Also, the second manufacturing mode allows saving the manufacturing time, and improves therefore the productivity of the manufacturing line.

Common to both the first manufacturing mode and the second manufacturing mode, the method 100, 200 for manufacturing the coated plastic part 1 offers numerous advantages, in particular:

the possibility of positioning the flaps 12 in raised sectors 6 having complex shapes,
a reduced energy consumption compared with a method using the thermoforming,
a possible implementation on pre-existing machines such as a die-forging machine, or an injection molding machine,
a reduced manufacturing time.

The invention claimed is:

1. A method for manufacturing a coated plastic part intended to be integrated into a passenger compartment of a motor vehicle, the coated plastic part including
   a base part made of thermoplastic material comprising at least one raised sector,
   a sheet comprising at least one useful surface, the method comprising:
      a step of creating of at least one flap in the useful surface, said step of creating comprises making cuts and marking at least one fold within the useful surface, according to a predetermined pattern, so as to define the at least one flap
      a positioning step in which the sheet is positioned facing a shaping tool comprising a raised area complementary in shape to the raised sector, the useful surface being positioned opposite the raised area,
      a shaping step, in which the sheet is pressed against the shaping tool, the flap being displaced to contact the raised area,
      a joining step in which the sheet and the base part are held against each other so as allow securing the sheet to the base part.

2. The method according to claim 1, wherein during the shaping step, the sheet is pressed against the shaping tool via a suction force created by a depression originating from the shaping tool.

3. The method according to claim 1, wherein the cuts are made using a punching tool, a cutting blade, a plasma cutting tool, or a laser cutting tool.

4. The method according to claim 1, wherein the base part is obtained before the joining step (103), the method comprising before the positioning step, a gluing step (101) including the application of an adhesive on the useful surface, securing the sheet to the base part during the joining step (105) is performed by hardening the applied adhesive.

5. The method according to claim 4, wherein the adhesive is a glue deposited on the useful surface by spraying, or by lamination or by application of a stencil previously glued by the glue.

6. The method according to claim 1, wherein the joining step (105) is carried out within a die-forging machine, the die-forging machine comprising a die capable of translating, the die being provided with the shaping tool of tool, the die-forging machine also comprising a platform receiving the base part, during the joining step (105) the die translating towards the platform and putting into contact the base part and the sheet.

7. The method according to claim 1, wherein it comprises an injection step (204), the injection step (204) and the joining step (205) being carried out in an injection molding machine comprising a first mold half having a molding wall provided with the shaping tool, the mold halves (26, 27) being displaced relative to each other and being capable of being sealingly joined together by defining a molding cavity having a shape identical to the base part, during the injection step (204), the mold halves (26, 27) are joined together, a liquid thermoplastic is introduced into the cavity, the joining step (205) being carried out by cooling the thermoplastic injected into the molding cavity.

* * * * *